US005404962A

United States Patent [19]

Carter

[11] Patent Number: 5,404,962

[45] Date of Patent: Apr. 11, 1995

[54] COLLAPSIBLE SUPPORT

[76] Inventor: John T. Carter, 2741 N. Vista Bluff Rd., Orange, Calif. 92667

[21] Appl. No.: 88,852

[22] Filed: Jul. 7, 1993

[51] Int. Cl.[6] .............................................. F16M 11/00

[52] U.S. Cl. .................................... 182/153; 182/225; 182/155; 248/439; 248/188.6

[58] Field of Search ................ 182/153, 155, 225–227, 182/181–186; 248/439, 188.6, 188, 439; 108/131

[56] References Cited

U.S. PATENT DOCUMENTS

| | | | |
|---|---|---|---|
| 2,271,701 | 2/1942 | Maxwell | 182/153 |
| 3,502,174 | 3/1970 | Cannon | 182/155 |
| 4,063,703 | 12/1977 | Shy | 248/439 |
| 4,515,243 | 5/1985 | Prior | 182/155 |

*Primary Examiner*—Alvin C. Chin-Shue
*Attorney, Agent, or Firm*—Roy A. Ekstrand

[57] ABSTRACT

A collapsible support includes a cross member and a pair of collapsible support brackets having pairs of generally tubular legs extending therefrom. Each support bracket includes a generally planar base member secured to the cross member and a pivotally attached leg carrier. The leg pairs are secured to the leg carrier and are pivotable therewith from extended load bearing positions to collapsed storage or transport positions. A spring lock mechanism is provided which engages a portion of the leg carrier in the extended load bearing position and secures it in a releasable attachment in the load bearing position.

4 Claims, 2 Drawing Sheets

COLLAPSIBLE SUPPORT

FIELD OF THE INVENTION

This invention relates generally to support members such as sawhorses and the like and particularly to those using collapsible elements.

BACKGROUND OF THE INVENTION

In many work environments there arises a repeated need for a convenient support unit to support work in process or to provide a raised work surface for workers. Such support needs are frequently felt in the construction and industrial arts. However, substantial needs arise for the amateur worker or homemaker also.

While the structure of such support units varies substantially, all are intended to provide the basic function of a raised support surface capable of bearing a load. Perhaps the simplest and most common of such work supports is found in the popular "sawhorse" which provides a flexible and easy to use support system in which a horizontal member is provided with four supporting legs arranged in outwardly extending pairs at each end of the support member. In many cases for improved stability, the support leg pairs at each end are inclined and tend to diverge as they extend downward from the support member. In many instances, such sawhorses provide a convenient surface which may be used to support a workpiece in progress while operations such as sawing and drilling and the like may be carried forward. In other work environments, however, such sawhorses or similar supports are used in combination and arranged in a spaced apart relationship together with one or more lateral elements such as planks or scaffolding to provide a raised work surface for craftsman such as plasterers, carpenters, painters or the like.

Regardless of their use, such support members are often found to be difficult to store and transport and are often clumsy to handle and carry. Accordingly, there has arisen a need in the art for such support units which are collapsible to facilitate transportation and storage. While practitioners in the art have been led by this need to provide various collapsible support members in the past, such supports have often been subject to several limitations. Perhaps the most serious limitation has arisen in the tendency of the collapsing mechanism to reduce the load strength capability of the support member. In addition, such collapsible mechanisms are often found to be complex and, in many instances, expensive and difficult to manufacture.

There remains, therefore, a need in the art for a convenient, easily operated collapsible support which retains its load bearing strength despite its collapsible feature.

SUMMARY OF THE INVENTION

Accordingly, it is a general object of the present invention to provide an improved support unit. It is a more particular object of the present invention to provide an improved support unit having collapsible members for easy transport and storage. It is a still more particular object of the present invention to provide an improved collapsible support unit which retains its load bearing characteristic and which is relatively inexpensive and reliable to manufacture.

In accordance with the present invention, there is provided a collapsible support comprises: a generally planar load bearing base member having a first planar portion and a pair of orthogonally extending side walls; a leg carrier having a second planar portion, a pair of generally parallel side flanges and a transverse end flange; a pair of legs attached to the leg carrier and extending therefrom; pivot means for pivotally securing the leg carrier to the base member such that the leg carrier is pivotably between a first load bearing position in which the first and second planar portions are brought into load bearing contact, and a second collapsed position in which the first and second planar portion are separated; and lock means for releasably latching the leg carrier in the load bearing position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
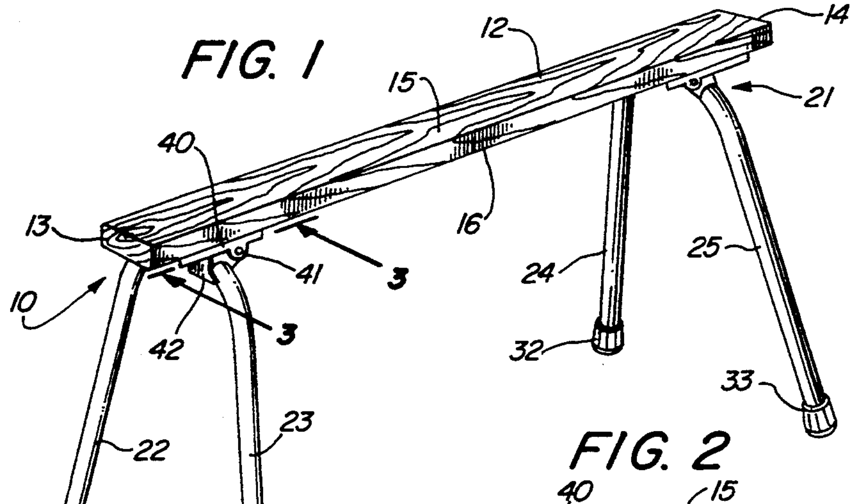
FIG. 1 sets forth a perspective view of a collapsible support constructed in accordance with the present invention.

FIG. 1 sets forth a perspective view of a support constructed in accordance with the present invention and generally referenced by numeral 10. Support 10 includes a cross member 12 having end portions 13 and 14, an upper surface 15 and an under surface 16. While any number of cross members may be used without departing from the spirit and scope of the present invention, it has been found particularly advantageous to utilize a wooden member such as a two-by-four for cross member 12. A pair of support brackets 20 and 21 are positioned adjacent ends 13 and 14 respectively and secured to under surface 16 in the manner set forth below. Support bracket 20 includes a generally planar base member 40 and a leg carrier 42. A pivot 41 pivotally secures leg carrier 42 to base member 40. A pair of generally tubular support legs 22 and 23 are joined to and extend downwardly from leg carrier 42. Legs 22 and 23 terminate in a pair of grip cups 30 and 31 respectively which are fabricated of a resilient material to provide improved traction for the end portions of legs 22 and 23. In the position shown in FIG. 1, leg carrier 42 and legs 22 and 23 are fully extended and, by means set forth below in greater detail, locked in their load bearing positions.

A support bracket 21 is positioned adjacent end 14 and supports legs 24 and 25 having grip cups 32 and 33 respectively thereon. It should be understood that support bracket 21 and legs 24 and 25 are identical in all respects to support bracket 20 and legs 22 and 23. Therefore, the descriptions set forth below relating to support bracket 20 and legs 22 and 23 should be understood to apply with equal force to support bracket 21 and legs 24 and 25.

In accordance with the invention and by means set forth below in greater detail, legs 22 and 23 may be positioned and locked in the extended position shown in FIG. 1. Similarly, support bracket 21 and legs 24 and 25 may be positioned in the extended load bearing positions shown in FIG. 1. Thus when positioned as shown in FIG. 1, support 10 is configured to receive and support a substantial load upon cross member 12.

In accordance with an important aspect of the present invention, leg carrier 22 is pivotable with respect to pivot 41 to pivot legs 22 and 23 about pivot 41 to a second collapsed position in which legs 22 and 23 are substantially parallel to cross member 12. Similarly, because of its identical fabrication to support bracket 20, support bracket 21 is pivotable to position legs 24 and 25 in a similar nearly parallel arrangement to cross member 12. When support 10 is thus configured, it forms a compact, easily stored and easy to carry unit which may be readily reassembled to its load bearing position by simply rotating legs 22 and 23 away from cross member 12 until the locking mechanism described below secures legs 22 and 23 in their extended position. Similarly, legs 24 and 25 may be pivoted with respect to cross member 12 until legs 24 and 25 are similarly locked in the extended position shown.

Figure 2:
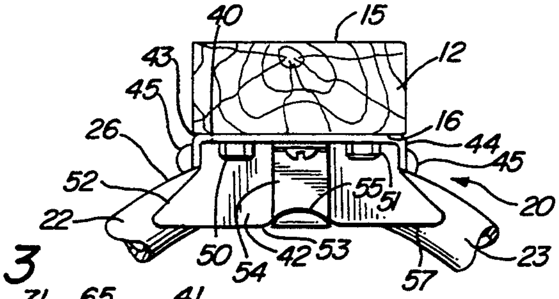
FIG. 2 sets forth a partially sectioned end view of the present invention collapsible support.

FIG. 2 sets forth a partially sectioned end view of the present invention collapsible support. Cross member 12 defines a generally rectangular cross section having an upper surface 15 and an under surface 16. A support bracket 20 includes a generally planar base 40 having a pair of downwardly extending side walls 43 and 44. A plurality of fasteners 50, 51, 58 and 59 extend through apertures (not seen) in base 40 and engage cross member 12. Fasteners 58 and 59 are better seen in FIG. 4. It will be apparent to those skilled in the art that any number of fasteners may be used in place of fasteners 50, 51, 58 and 59 without departing from the spirit and scope of the present invention. However, it has been found advantageous to use conventional wood screw-type bolts having a substantially coarse thread for fasteners 50, 51, 58 and 59. A leg carrier 22 is pivotally secured to side walls 43 and 44 of base 40 by a pivot pin 45. Side walls 43 and 44 as well as leg carrier 42 and pin 45 cooperate to form pivot 41 about which leg carrier 42 is pivotable with respect to base 40 in the manner described above. Leg carrier 42 further includes a generally planar outwardly extending end flange 52 having a notch 53 defined therein. End flange 52 further defines a generally straight edge 57 extending on either side from notch 53. In accordance with an important aspect of the present invention and by means set forth below in greater detail, end flange 52 is rigidly secured to legs 22 and 23 by a secure attachment such as high strength welding. It should be noted that legs 22 and 23 are, in their preferred form, fabricated from a high strength tubular steel having a generally circular cross section. In addition, for maximum strength, legs 22 and 23 are formed of a single piece of high strength metal tubing and form a generally U-shaped portion 26 which is secured to leg carrier 42 in the manner described below. A spring clip 54 formed of a spring steel material or the like defines a generally L-shaped member (better seen in FIG. 3) which is secured to base 40 by a conventional fastener 56. Spring clip 54 further defines an end tab 55 which is configured to be received within notch 53 of end flange 52 and provide a spring lock which maintains leg carrier 42 in the extended position.

Leg carrier 42 may be pivoted with respect to base 40 from the locked position shown by applying an appropriate force to tab 55 whereby tab 55 is withdrawn from notch 53 to release end flange 52 and permit leg carrier 42 as well as legs 22 and 23 to pivot with respect to base 40. It will be apparent to those skilled in the art that a number of elongated members may be used for pin 45 to pivotally secure side walls 43 and 44 to leg carrier 42. However, it has been found economically advantageous to fabricate pin 45 from an elongated high strength rivet or similar member. Alternatively, however, a conventional bolt and nut combination may be used or a solid steel rod inserted therethrough and staked over or swaged at each end.

Figure 3:
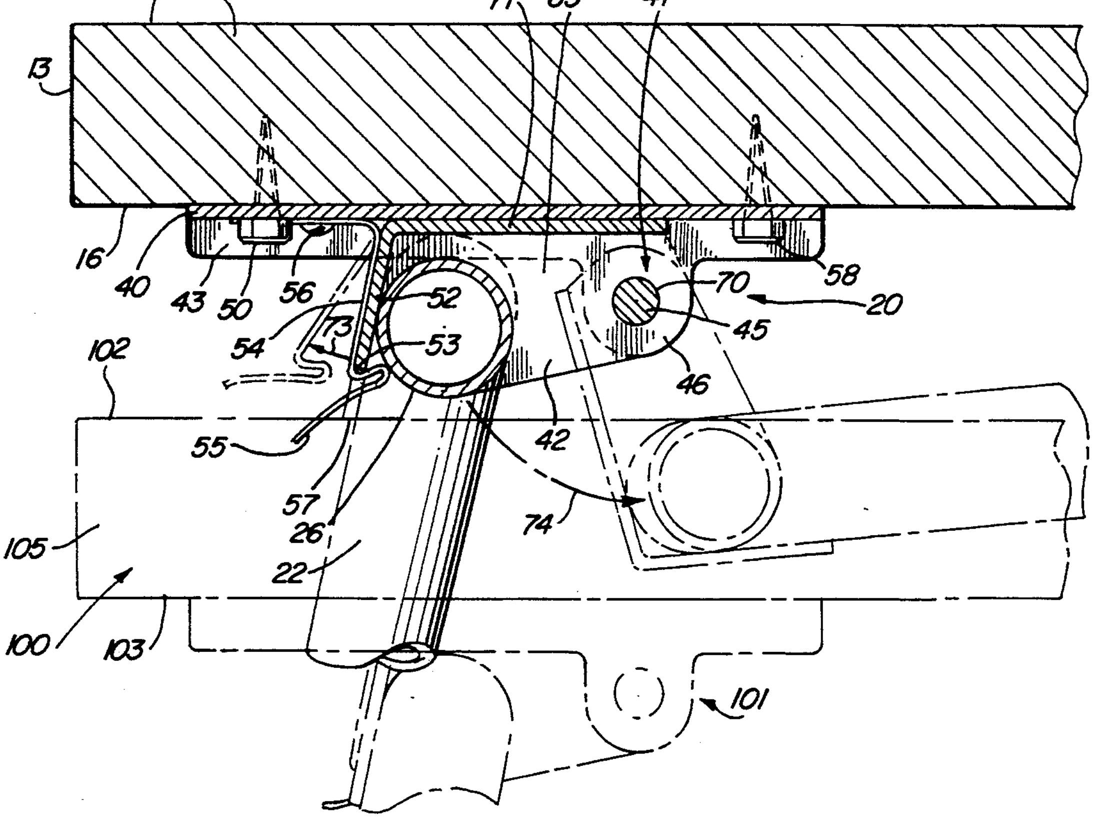
FIG. 3 sets forth a section view of the present invention collapsible support taken along section lines 3–3 in FIG. 1.

FIG. 3 sets forth a section view of support 10 taken along section lines 3—3 thereof. Cross member 12 defines a generally rectangular cross section having an end 13, an upper surface 15 and an under surface 16. Support bracket 20 includes a generally planar base 40 having a downwardly extending side wall 43 which in turn defines a further extending flange 46. Base 40 is secured to under surface 16 of cross member 12 by a plurality of fasteners including fasteners 50 and 58 as well as fasteners 51 and 59 (seen in FIG. 4). A leg carrier 42 formed of a rigid metal material such as steel defines an end flange 52 having a notch 53 defined therein. Flange 52 further defines a downwardly extending edge 57. An upper wall 70 extends laterally from end flange 52 and is continuous therewith. Upper wall 71 further defines a pair of downwardly extending side flanges 65 and 66 (the latter seen in FIG. 4). Side flanges 65 and 66 are continuous with upper wall 71. In accordance with an important aspect of the present invention, side flanges 65 and 66 as well as end flange 52 are securely attached to U-shaped portion 26 of legs 22 and 23 by a secure attachment such as high strength welding. Thus, U-shaped portion 26 of legs 22 and 23 together with leg carrier 42 form a strong rigid integral unit which is pivotable about pivot 41. As mentioned above, side wall 43 defines a downwardly extending flange extension 46. Side flange 65 defines an aperture 70 therethrough which receives pin 45. It will be understood that, while not seen in FIG. 3, flange extension 46 of side wall 43 defines a similarly aligned aperture which also receives pin 45 to complete one side of pivot 41.

Figure 4:
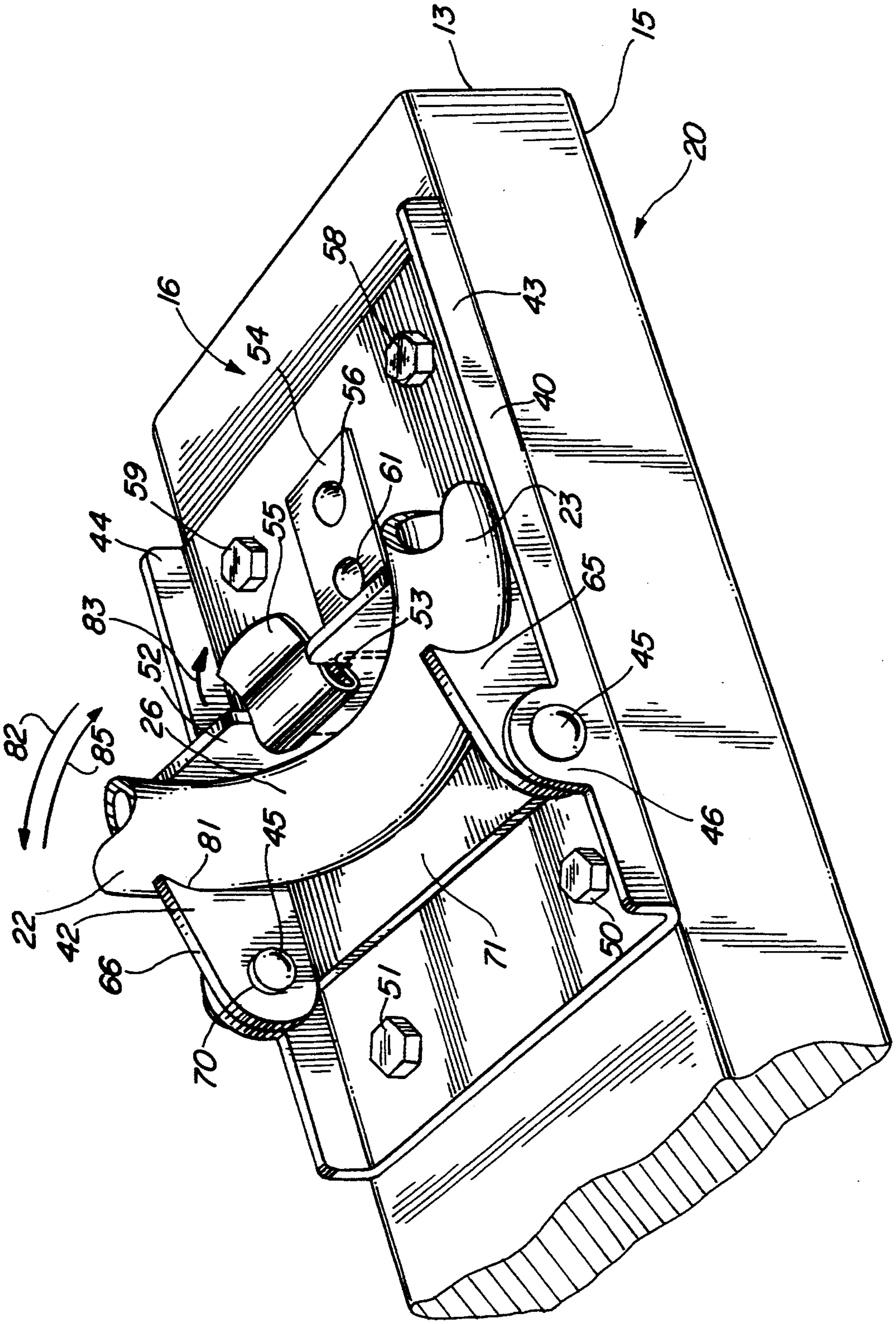
FIG. 4 sets forth a partially sectioned perspective view of the collapsing mechanism of the present invention collapsible support.

As described above, spring clip 54 defines a generally L-shaped member secured to base 40 by a fastener 56 and a fastener 61 (the latter seen in FIG. 4). Spring clip 54 further defines a lock tab 55 which is received within notch 53 of end flange 52. The locking character of lock tab 55 and spring clip 54 cooperate to lock leg carrier 42 in the collapsed position shown in solid-line representation in FIG. 3.

It will be apparent to those skilled in the art upon examination of FIG. 3 that support bracket 20 and legs 22 and 23 cooperate to provide a high strength load bearing combination. Upper wall 71 and base 40 provide substantial load bearing surfaces which further enhance the load bearing characteristics of support bracket 20. In addition, it should be noted that the pivotal mechanism which permits pivotal motion of leg carrier 42 about pivot 41 does not detract from the load bearing characteristics of support bracket 20.

In the event it is desired to move legs 22 and 23 from the locked position shown in FIG. 3 to their collapsed position shown in dashed line representation in FIG. 3, a force in the direction of arrow 73 is applied to tab 55 overcoming the spring force of spring clip 54 and bending it to the more acutely angled position shown in dashed line representation in FIG. 3. The bending of spring clip 54 withdraws lock tab 55 from notch 53 which in turn frees leg carrier 42 to pivotally rotate about pivot 41 in the direction indicated by arrow 74. The pivotal motion of leg carrier 42 may be continued until legs 22 and 23 and leg carrier 42 have moved to the position shown in dashed line representation in FIG. 3. Thus, legs 22 and 23 may be positioned substantially parallel to cross member 12. In the event it is desired to resume the locked load bearing position of legs 22 and 23, leg carrier 42 is pivoted in the opposite direction of arrow 74 until end flange 52 is forced against spring clip 54. Continued pivotal motion of leg carrier 42 thereafter forces tab 55 to be reinserted in a locking engagement within notch 53 and completes the return to the load bearing configuration shown in FIG. 3. In accordance with an important aspect of the present invention, it should be noted that the locking mechanism and the pivotal attachment of leg carrier 42 in no way reduce the load bearing characteristics of support bracket 20.

In accordance with a further advantage of the present invention support, a second support generally referenced by numeral 100 and shown in dashed line representation is positioned in accordance with the stacking capability of the present invention support. Accordingly, support 100 is identical to support 10 and includes a generally rectangular cross section cross member 105 having an upper surface 102 and an under surface 103. Support 100 includes a support bracket 101 which is substantially identical to support bracket 20 and is secured to under surface 103 in the same manner. In the stacked position shown, support 10 is received upon support 100 such that legs 22 and 23 extend on either side of cross member 105. When so stacked, edge 57 rests against upper surface 102 providing a convenient resting edge. Thus, a number of the present invention supports may be stacked in a "nested" manner to provide further convenience and ease of use.

FIG. 4 sets forth a partially sectioned perspective view of support 20. A cross member 12 defines a generally rectangular cross section, an end portion 13, an upper surface 15, and an under surface 16. A support bracket 20 includes a generally planar base member 40 having a pair of extending side walls 43 and 44. Side walls 43 and 44 define flange extensions 46 and 47 respectively. A plurality of fasteners 50, 51, 58 and 59 extend through apertures (not seen) in base 40 and engage cross member 12 to secure base 40 to under surface 16. Support bracket 20 further includes a rigid leg carrier 42 formed of a generally planar end flange 52, a planar upper wall 71, and a pair of side flanges 65 and 66. A generally U-shaped portion 26 of a pair of tubular legs 22 and 23 are securely joined to leg carrier 42 by a plurality of weld joints such as welds 80 and 81. End flange 52 defines a notch 53 and an edge 57. A generally L-shaped spring clip 54 is secured to base 40 by a pair of fasteners 56 and 61. While not seen in FIG. 4, it will be understood that both spring clip 54 and base 40 define apertures through which fasteners 56 and 61 extend to engage cross member 12 and secure spring clip 54 to base 40. Spring clip 54 further defines a multiply curved tab 55 which extends into notch 53 and engages end flange 52 in a locking engagement. An elongated cylindrical pin 45 extends through aperture 70 defined inside flange 66 as well as corresponding apertures in flanges 46 and 47 and side flange 65 (not seen) to provide a pivotal attachment between side flanges 65 and 66 and flange extensions 46 and 47. As described above, pin 45 may be fabricated from a number of different structures such as a conventional bolt and nut arrangement, a high strength rivet, or an elongated steel rod having staked over portions on the outside of flanges 46 and 47. In any event, the important aspect with respect to the present invention provided by pin 45 is that of a pivotal member about which leg carrier 42 may be pivoted with respect to base 40.

In the position shown in FIG. 4, legs 22 and 23 and leg carrier 42 are secured in their extended load bearing position and are locked therein by the intrusion of tab 55 of spring clip 54 into notch 53. As described above, leg carrier 42 may be released from the locking engagement of spring clip 54 by pressing tab 55 downwardly and away from end flange 52 in the direction indicated by arrow 83. Once sufficient force is applied to tab 55 to overcome the spring force of clip 54 and withdraw tab 55 from notch 53, leg carrier 42 and legs 22 and 23 may be pivoted about pivot pin 45 in the direction indicated by arrow 82 to reconfigure support bracket 20 and legs 22 and 23 in the collapsed position shown in FIG. 3 and described in connection therewith. Thereafter, support bracket 20 and legs 22 and 23 may be returned to the locked position shown in FIG. 4 by simply pivoting legs 22 and 23 and leg carrier 42 about pin 45 in the direction indicated by arrow 85 until tab 55 is forced into notch 53 in the above-described snap-fit engagement.

What has been shown is a collapsible support capable of sustaining substantial forces while providing an easy and convenient collapsible feature. The support shown may be easily and economically manufactured and may be readily secured to any number of to-be-supported elements through the use of conventional fasteners and the like.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A collapsible support comprising:

a generally planar load-bearing base member having a first planar portion and a pair of orthogonally extending generally parallel sidewalls forming a channel therebetween and each sidewall defining an aperture therein;

a leg carrier having a second planar portion, a pair of generally parallel side flanges each of said side flanges defining an aperture therein and an open notch and a transverse end flange, said side flanges being received within said channel and being generally parallel with and spaced closely to said sidewalls;

a pair of legs forming straight portions and a common generally U-shaped portion, said U-shaped portion being received within said leg carrier between said side flanges, said end flange and said second planar portions, said U-shaped portion extending through said open notches and being joined to said side flanges and said end flange by welded attachments;

pivot means for pivotally securing said leg carrier to said base member such that said leg carrier is pivotable between a first load bearing position in which said first and second planar portions are brought into load bearing contact and a second collapsed position in which said first and second planar portions are separated, said apertures in said sidewalls and side flanges being aligned on a common transverse axis and said pivot means including an elongated cylindrical pivot member extending through said apertures; and lock means for releasable latching said leg carrier in said load bearing position.

2. A collapsible support as set forth in claim 1 wherein said end flange defines a notch and wherein said lock means includes a generally L-shaped spring having a first end secured to said base member and a second end extending toward said notch and an end tab received within said notch in a snap-fit engagement when said leg carrier is in said load bearing position.

3. A collapsible support as set forth in claim 2 wherein said U-shaped member is formed of a tubular material.

4. A collapsible support as set forth in claim 3 wherein said end flange defines edge portions on each side of said notch extending beyond said end tab of said spring when said leg carrier is in said load bearing position to permit nested stacking of said collapsible support.

* * * * *